United States Patent
Lu et al.

(10) Patent No.: US 7,428,358 B2
(45) Date of Patent: Sep. 23, 2008

(54) OPTICAL COUPLER FOR COUPLING AN OPTICAL FIBER INTO A WAVEGUIDE

(75) Inventors: Zhaolin Lu, Newark, DE (US); Dennis W. Prather, Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 10/597,162

(22) PCT Filed: Jan. 14, 2005

(86) PCT No.: PCT/US2005/001427

§ 371 (c)(1),
(2), (4) Date: Jul. 13, 2006

(87) PCT Pub. No.: WO2005/120187

PCT Pub. Date: Dec. 22, 2005

(65) Prior Publication Data

US 2007/0031088 A1 Feb. 8, 2007

Related U.S. Application Data

(60) Provisional application No. 60/536,631, filed on Jan. 15, 2004.

(51) Int. Cl.
*G02B 6/30* (2006.01)
(52) U.S. Cl. ............... 385/49; 385/14; 385/39; 385/43; 385/129; 385/130; 385/131

(58) Field of Classification Search ............... 385/49, 385/43, 27, 28, 30, 31, 36, 38, 39, 50, 129, 385/130, 131, 132, 14
See application file for complete search history.

(56) References Cited

U.S. PATENT DOCUMENTS

| | | | | |
|---|---|---|---|---|
| 6,556,759 | B2 * | 4/2003 | Roberts et al. | 385/132 |
| 6,611,636 | B2 | 8/2003 | Deliwala | 385/14 |
| 6,671,443 | B2 | 12/2003 | Deliwala | 385/125 |
| 6,813,432 | B2 * | 11/2004 | Salib | 385/129 |
| 6,912,330 | B2 | 6/2005 | Deliwala | 385/14 |
| 7,088,890 | B2 * | 8/2006 | Liu | 385/43 |
| 2002/0191916 | A1 * | 12/2002 | Frish et al. | 385/43 |
| 2003/0161571 | A1 * | 8/2003 | Davids et al. | 385/14 |
| 2004/0114869 | A1 * | 6/2004 | Fike et al. | 385/43 |
| 2007/0031088 | A1 * | 2/2007 | Lu | 385/49 |

* cited by examiner

*Primary Examiner*—Brian M Healy
(74) *Attorney, Agent, or Firm*—RatnerPrestia

(57) ABSTRACT

An optical coupler for parallel coupling from a single mode optical fiber, or fiber ribbon, into a silicon-on-insulator (SOI) waveguide for integration with silicon optoelectronic circuits. The optical coupler incorporates the advantages of the vertically tapered waveguides and prism couplers, yet offers the flexibility of planar integration. The optical coupler may be fabricated using wafer polishing technology or grayscale photolithography. The optical coupler can be packaged using epoxy bonding to form a fiber-waveguide parallel coupler or connector.

10 Claims, 4 Drawing Sheets

OPTICAL COUPLER FOR COUPLING AN OPTICAL FIBER INTO A WAVEGUIDE

CROSS-REFERENCE TO RELATED APPLICATIONS

This application is a National Stage entry under 35 U.S.C. §371 of International Application PCT/US2005/01427 filed on Jan. 14, 2005. International Application PCT/US2005/01427 claims priority under 35 U.S.C. §119 to U.S. Provisional Patent Application Ser. No. 60/536,631, filed Jan. 15, 2004. The entire contents of each of the above applications are incorporated herein by reference.

STATEMENT OF GOVERNMENT RIGHTS

The United States Government has a paid-up license in the present invention and the right in limited circumstances to require the patent owner to license others on reasonable terms as provided for by the terms of Award No. N00014-03-1-0758 awarded by Office of Naval Research.

BACKGROUND

A. Field of the Invention

The present invention relates generally to optical couplers, and, more particularly to an optical coupler for coupling an optical fiber into a silicon-on-insulator (SOI) waveguide.

B. Description of the Related Art

Silicon-on-insulator (SOI) is one of the more recent and promising integrated optics technologies because it allows the use of conventional microelectronics patterning and fabrication techniques and it offers a high index contrast for strong light confinement in small dimensions. This enables the miniaturization of functional integrated optical devices and the ability to monolithically integrate electronic and optical circuits. For nanometer SOI integrated optics, one of the key issues is efficient light coupling into SOI waveguides. Following the conventional methods for coupling into polymer waveguides, four main approaches are taken to couple light into SOI waveguides: transverse coupling, grating coupling, prism coupling, and vertical tapering.

Transverse coupling, including end-fire coupling and end-butt coupling, has been a coupling efficiency approximately proportional to the mode dimension ratio. However, the mode size of a single mode SOI waveguide is often on the order of hundreds of nanometers due to higher refractive index contrast. As a result, very low efficiency occurs for transverse coupling.

Grating coupling is not well-suited for optical integrated circuits (OIC) due to difficulty in mode matching, sensitivity to wavelengths, complexity of design and fabrication. One solution to these problems includes a 90 degree grating coupler designed and fabricated from an optical fiber to wide waveguide. Two-dimensional simulations show that up to a 74% coupling efficiency between a single-mode optical fiber and a 240-nm-thick GaAs—AlO$_x$ waveguide may be achieved, however, the coupling efficiency was measured to be only 19%. Another proposed solution includes a fiber-waveguide coupler composed of two one to three millimeter-long gratings and four layers. A 95% coupling efficiency can be achieved with this, however, the structure is difficult to fabricate.

Thus, there is a need in the art for an optical coupler for coupling an optical fiber to a SOI waveguide that overcomes the problems of the related art.

SUMMARY

The present invention solves the problems of the related art by providing an optical coupler for coupling an optical fiber into a silicon-on-insulator (SOI) waveguide efficiently and economically.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof. The present invention is broadly drawn to an optical coupler that incorporates the advantages of the prism couplers and tapered waveguides, yet more easily integrates into the planar manufacturing process.

Figure 1:
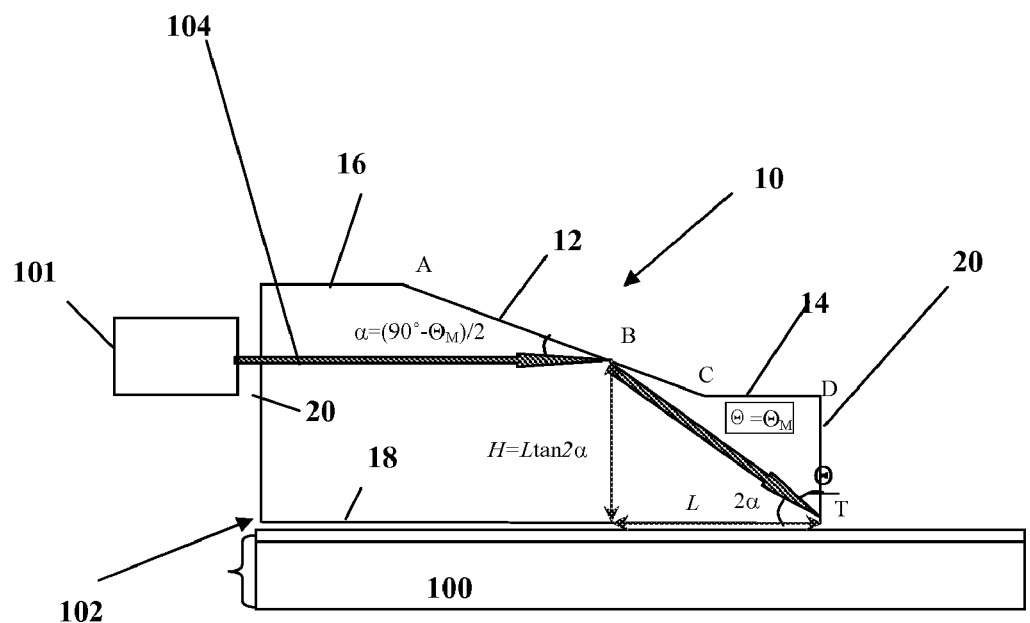
FIG. 1 is a schematic cross-sectional view of an optical coupler in accordance with an embodiment of the present invention.

A slab waveguide consists of three layers: the cladding, guiding and substrate layers, which have refractive indices $n_c$, $n_g$, and $n_s$, respectively. The imposition of an electromagnetic boundary condition leads to two physical conditions: (1) total internal reflection in the guiding layer; and (2) a phase matching condition in each layer, which results in a set of discrete modes and their corresponding mode angles. With the optical coupler of present invention (shown generally as reference numeral 10 in FIG. 1), guided waves can be introduced with the appropriate mode angle and thereby achieve high coupling efficiency, as shown in FIG. 1.

Optical coupler 10 may be made from a variety of materials, but is preferably constructed of silicon. As shown in FIG. 1, optical coupler includes a tapered top portion 12 connecting together first and second top planar portions 14, 16, and a base portion 18 connecting together with first and second top planar portions 14, 16 with side portions 20. The intersection of base portion 18 and one side portion forms a termination point T.

Optical coupler 10 looks like a vertically tapered waveguide, in which direct polishing or gray scale lithography may be used to create a smooth slope on a double polished silicon wafer with a desired slope angle α. For example, slope angle α may be 16.1° for 260 nanometer (nm) SOI waveguide. When a laser or light beam 104 from an optical fiber 101 is incident upon optical coupler 10 at a parallel or almost parallel angle to an SOI waveguide 100, light beam 104 is bent to the termination point T of optical coupler 10 by total internal reflection. The slope is designed with such a slope angle α that the incident angle at point T is equal to the waveguide mode angle $\Theta_M$. As such, light beam 104 produces a very strong evanescent electromagnetic field in a narrow region below the coupler base and light beam 104 can thus tunnel through the low-index gap (tunnel layer 102) between optical coupler 10 and SOI waveguide 100, and become launched into SOI waveguide 100. According to the geometrical relations, slope angle α satisfies the following equation (1):

$$\alpha = (90° - \Theta_M)/2, \quad (1)$$

and the termination point satisfies the following equation (2):

$$L = H/\tan 2\alpha. \quad (2)$$

When the slope is lengthened, the tolerance of the slope angle α and termination point T will increase because there is a larger range for adjusting the incident position.

For optical tunneling, the prism coupling theory may be used as a reference. For traditional polymer waveguides, whose cladding and guiding layers are realized using two different polymers, $n_g = n_c + \Delta n$, where $\Delta n$ is often quite small. As a result, the mode angle $\Theta_M$ (to the normal) is large. For this reason, it has become widely accepted that the refractive index of the coupler, $n_p > n_g > \max(n_c, n_s)$ is required for mode matching. However, in the case of high index contrast waveguides this condition is not as restrictive since the mode angle of the waveguide is much smaller. In particular, high efficiency coupling using the same index, notably that of silicon, can be achieved. To demonstrate this, silicon couplers were fabricated to couple light into a 260 nm SOI slab waveguides. The refractive indices of the cladding layer, air ($n_c = 1.00$), and the guiding layer, silicon ($n_g = 3.48$), have a very large difference. Consequently, the mode angle ($\Theta_{TE} = 58.1°$ for 1550 nm TE and $\Theta_{TM} = 40.7°$ for TM light) is quite small. Therefore, to match the modes, a higher refractive index of the coupler than of the guiding layer is not necessary.

In the coupler, two coupling effects are in competition, namely, tunneling into the waveguide and leaking back into the coupler. The output beam results from the integration of tunneling minus leakage over all feed-in points. As a result, there exists a condition of optimal coupling. It has been shown that the optimal coupling is equivalent to matching the spatial amplitude distribution of the input beam to the leakage field of the coupler, and theoretically that 81% coupling efficiency for a uniform tunnel layer and 96% for a linearly tapered tunnel layer can be achieved between a flint glass prism and a polymer waveguide.

Figure 2:
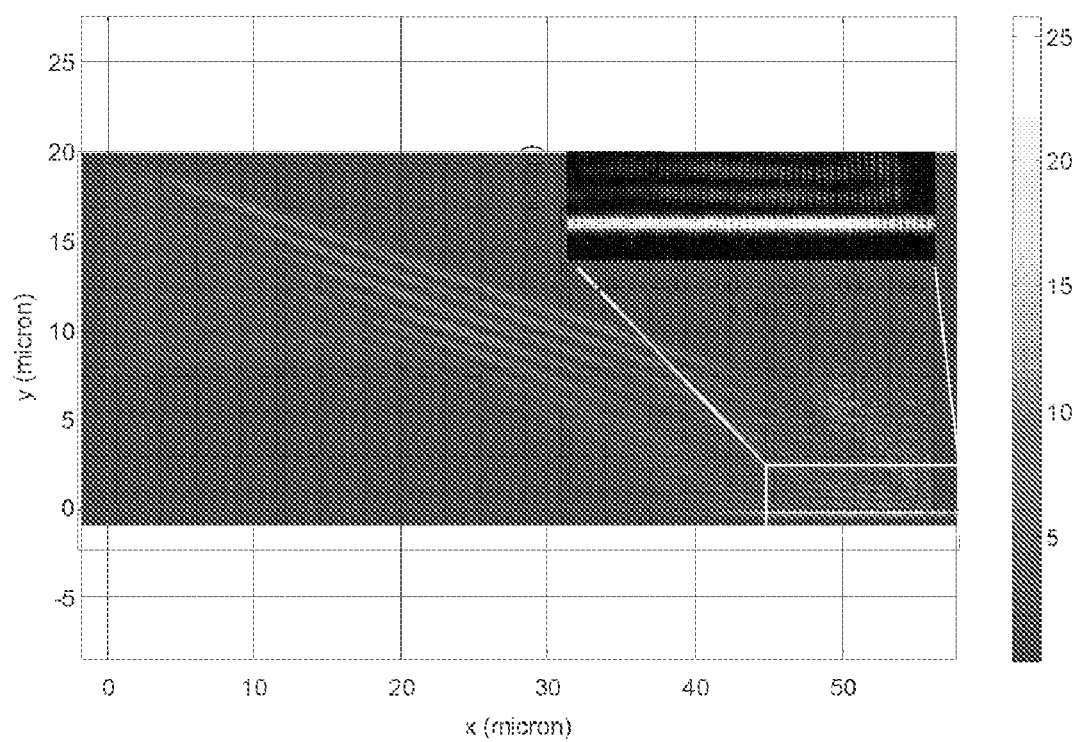
FIG. 2 is a graph showing a finite-different time-domain (FDTD) simulation result for the optical coupler shown in FIG. 1.

The optical coupler of the present invention optimizes the coupling parameters using the plane-wave method: the incident angle, the tunnel layer thickness, and the beam size. With the optical coupler of the present invention, an optimal coupling efficiency of 77% occurs for an air tunnel layer of 160 nm and a beam size 20.4 micrometers (μm) when working at λ=1550 nm (TE mode). Applying these parameters, the optical coupler of the present invention was validated using computational electromagnetic simulations based on the finite-difference time-domain (FDTD) method. FIG. 2 illustrates the simulation result for TE mode light coupled into the 260 nm SOI slab waveguide. A windowed TE light with λ=1550 nm source is incident on the silicon coupler. The slope is designed to satisfy the mode angle of the slab waveguide. This result can be applied to larger couplers when shifting the incident point only if the slope is straight and long. Similarly, there is a set of optimal parameters for the TM mode. However, due to the large difference in mode angles, the optical coupler cannot couple both TE and TM modes into the waveguide simultaneously. For this reason, coupling for the TE mode is demonstrated. For TM mode coupling, similar results should occur for the optical coupler except that the slope angle of the optical coupler changes to 24.7°.

Figure 3:
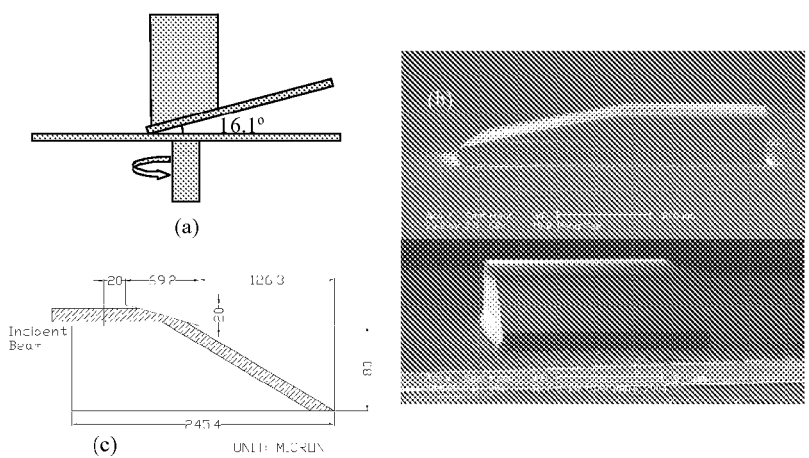
FIG. 3(a) is schematic cross-sectional view of a polishing mechanism for fabricating the optical coupler shown in FIG. 1.
FIG. 3(b) is a scanning electron microscope (SEM) picture of an optical coupler of the present invention fabricated by direct polishing.
FIG. 3(c) is an illustration of a grayscale-lithographed optical coupler of the present invention.

To experimentally demonstrate this technique, a coupler was fabricated using a direct polishing method. To do this, a polishing stage was constructed with a tilt angle of 16.1°, as shown in FIG. 3(a). Next a carefully cleaved silicon wafer slab (350 μm thick) was selected, the cleavage side was polished, and the polished slab was glued on the sample stage. After coarse polishing using a 1.0 μm grid size diamond lapping film up to about two-thirds of the wafer thickness, fine polishing using a 0.1 μm film, and followed by final polishing using a 0.05 μm film, the silicon slab was cleaved using a diamond saw and then the incident surface was polished. FIG. 3(b) shows the SEM picture of the coupler fabricated using this method.

An alternate method for fabricating the coupler is based on grayscale lithography and inductively coupled plasma (ICP) etching. In this case, the coupler is designed as shown in FIG. 3(c), a continuous-tone grayscale mask is prepared using high-energy-beam-sensitive (HEBS) glass. After lithography, ICP etching, and lift-off, a grayscale-lithographed coupler is complete. This method has the advantage that no polishing is needed and smaller couplers can be fabricated.

Figure 4:
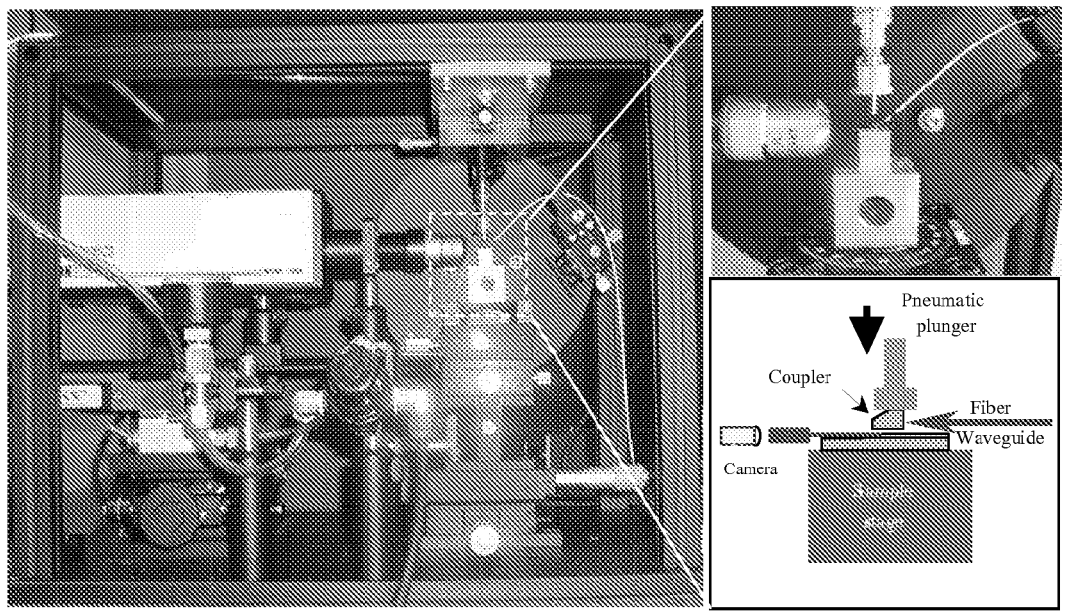
FIG. 4 is a picture of an epoxy-bonding machine for bonding the optical coupler of the present invention to an optical fiber and a waveguide.

Two setups were built to test the optical of the present invention. One setup is used for coupling evaluation, and the other setup is used for device bonding. Principally, the second setup is a rotational version of the first setup, except that extra components are added for bonding. Three factors affect the coupling efficiency for the optical coupler: the incident angle, the tunnel layer thickness, and the beam size. In both setups, these factors can be adjusted until the coupling efficiency is optimized. FIG. 4 shows only the second test setup since the second setup is more complex. In the setup of FIG. 4, a polarization-maintaining pigtailed fiber of a 1550 nm laser diode is clamped on a three-dimensional (3D) translation stage. This stage is installed on a vertical rotation stage to modify the incident angle. The sample (SOI waveguide) is mounted on the sample stage, consisting of a 3D translation stage, a rotational stage, and goniometers, by which the sample position and the waveguide orientation can be adjusted. In addition, a soldering iron hole is provided under the sample stage for thermo-cured epoxy bonding. The optical coupler is affixed to a pneumatic plunger head, which is pushing from the top and can control the tunnel layer thickness by adjusting the pressure between the coupler and the sample. A microscope objective and an infrared camera are used to observe the out coupling.

Figure 5:
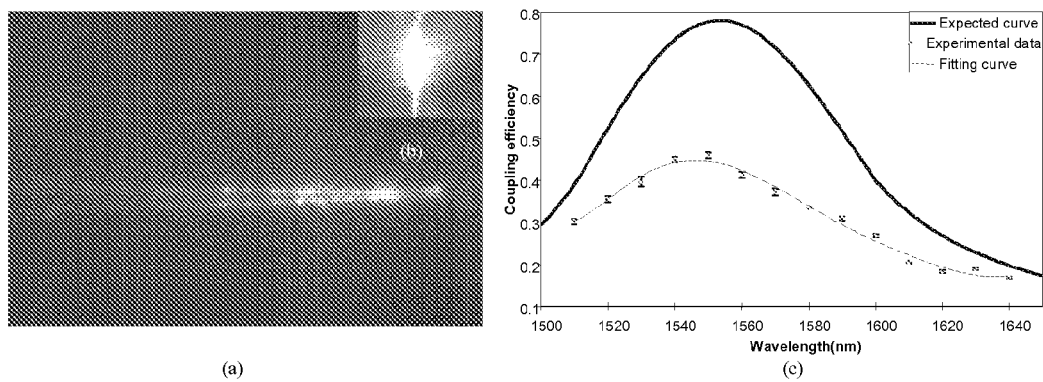
FIGS. 5(a) is a picture showing the coupling results of a light coupled into a waveguide (side view)
FIG. 5(b) is a picture showing the coupling results of a light coupled into a waveguide (front view)
FIG. 5(c) is a picture showing the spectrum response of the optical coupler of the present invention, wherein the solid line is an expected curve, the dashed line is an experimental fitting, and the diamond dots with bars are experimental data with standard deviation.

In the experiment, the 1550 nm TE light from a fiber is coupled into a 10 μm wide waveguide (on 260-nm-thick SOI) through a lateral taper, as shown in FIG. 5(a). High light density for out-coupling is observed on the end of the waveguide, as shown in FIG. 5(b). In order to evaluate the coupling efficiency, a long, narrow SOI slab instead of the lateral-tapered waveguide is used in the experiments to exclude the propagation loss due to the roughness of the waveguide sidewalls. The input power from the fiber, and output power from the slab are measured using a near IR power meter (for example, a LaserMate-Q™ powermeter available from Coherent, Inc.). The ratio between output and input is calculated to be 14.2%. Excluding the reflection on the incident surface of the coupler (30%), the loss in the silicon (−2 dB/cm), as well as the reflection on the output facet of the waveguide (30%), the coupling efficiency is estimated to be 46% for the SOI slab.

In optical communication applications, the transmission bandwidth is a key factor. In order to assess the spectral response of the optical coupler, a tunable laser (Agilent 8164A) is utilized as a light source in the experiment. The laser has a tuning range from 1510 nm to 1640 nm and tuning resolution as small as 0.01 nm. While maintaining a constant input power and incident angle, and scanning the wavelength over the tuning range, an output power is measured at every 10 nm of wavelength change, and the measurement is repeated five times at each wavelength to decrease random error. The spectral response of the coupler is shown in FIG. 5(c), in which the expected curve (solid line) is calculated by keeping the optimal parameters for 1550 nm-TE coupling but shifting the wavelength. The comparison of the fitting curve (dashed line) with expected curve shows a good match of the coupling tendencies. The results also show that the coupling efficiency changes quite slowly as a function of wavelength. The experimental response changes even slower than the expected result because propagation and scattering worsen the directivity of the light beam. Although the optimal response wavelength is 1550 nm, the coupler can work over a range of 1510 nm-1590 nm.

For optoelectronic integration, the optical fiber, optical coupler, and waveguide were bonded together with an epoxy-bonding machine, as shown in FIG. 4. Using this setup, the alignment between the optical fiber and the optical coupler can be adjusted. Once the maximum coupling is achieved, an epoxy (e.g., Epotek™ 353ND epoxy) is dispensed. After being heated to 120° C. for about two minutes, the epoxy is cured. In the end, an integrated coupler is formed and the pneumatic plunger can be detached. Under appropriate conditions, the loss introduced in the bonding process can be as low as −0.45 dB (10%). In addition, we found that Dynasolve™ 165 can be used to remove cured epoxy in the case of misalignment.

The optical coupler of the present invention provides many advantages over the related art. For example, the optical coupler incorporates the advantages of tapered waveguides and prism couplers. The optical coupler satisfies the requirement of parallel incidence, which makes it well-suited for the planar integration of optoelectronic devices. The optical coupler also shows flexibility in applications, simplicity in fabrication, reliability in alignment, high efficiency, and broadband transmission. In addition, the optical coupler may be used for coupling into other dielectric waveguides since the incident angle on the coupler base can be set in the range of about zero to 90° when designing a slope angle of about 45° to zero; and the material of the optical coupler may be altered to other high refractive and low loss materials, e.g. GaAs, based upon ease of fabrication. Thus, the optical coupler of the present invention provides a general solution for coupling into semiconductor waveguides and integration of planar optoelectronic devices.

It will be apparent to those skilled in the art that various modifications and variations can be made in the optical of the present invention and in construction of the optical coupler without departing from the scope or spirit of the invention. Examples of which have been previously provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical coupler for coupling light from an optical fiber to a silicon-on-insulator waveguide, comprising:
    first and second top planar portions;
    a tapered top portion connecting the first and second top planar portions; and
    a base portion connecting to the first and second top planar portions with side portions, the intersection of the base portion and one side portion forming a termination point;
    wherein the tapered portion has a slope angle such that the light from the optical fiber reflects from the tapered portion and is incident upon the termination point, and the incident angle of the light at the termination point equals a mode angle of the silicon-on-insulator waveguide.

2. An optical coupler as recited in claim 1, wherein the base portion faces the silicon-on-insulator waveguide.

3. An optical coupler as recited in claim 1, wherein the optical coupler produces an evanescent electromagnetic field in a region below the base portion so that light travels through a gap between the base portion and the silicon-on-insulator waveguide and enters the silicon-on-insulator waveguide.

4. An optical coupler as recited in claim 1, wherein the slope angle ($\alpha$) satisfies the following equation: $\alpha = (90° - \Theta_M)/2$ where $\Theta_M$ is the mode angle of the silicon-on-insulator waveguide.

5. An optical coupler as recited in claim 1, wherein the optical coupler comprises silicon.

6. An optoelectronic package, comprising:
    an optical fiber;
    a silicon-on-insulator waveguide; and
    an optical coupler affixed to the optical fiber and the silicon-on-insulator waveguide for coupling light from an optical fiber to a silicon-on-insulator waveguide, the optical coupler comprising: first and second top planar portions; a tapered top portion connecting the first and second top planar portions; and a base portion connecting to the first and second top planar portions with side portions, the intersection of the base portion and one side portion forming a termination point;
        wherein the tapered portion has a slope angle such that the light from the optical fiber reflects from the tapered portion and is incident upon the termination point, and the incident angle of the light at the termination point equals a mode angle of the silicon-on-insulator waveguide.

7. An optoelectronic package as recited in claim 6, wherein the base portion faces the silicon-on-insulator waveguide.

8. An optoelectronic package as recited in claim 6, wherein the optical coupler produces an evanescent electromagnetic field in a region below the base portion so that light travels through a gap between the base portion and the silicon-on-insulator waveguide and enters the silicon-on-insulator waveguide.

9. An optoelectronic package as recited in claim 6, wherein the slope angle ($\alpha$) satisfies the following equation: $\alpha = (90° - \Theta_M)/2$ where $\Theta_M$ is the mode angle of the silicon-on-insulator waveguide.

10. An optoelectronic package as recited in claim 6, wherein the optical coupler comprises silicon.

* * * * *